(12) United States Patent
Mei (10) Patent No.: US 7,131,334 B2
(45) Date of Patent: Nov. 7, 2006

(54) PRESSURE SENSOR DEVICE AND METHOD

(75) Inventor: Hai Mei, Plano, TX (US)

(73) Assignee: Celerity, Inc., Austin, TX (US)

( * ) Notice: Subject to any disclaimer, the term of this patent is extended or adjusted under 35 U.S.C. 154(b) by 185 days.

(21) Appl. No.: 10/827,026

(22) Filed: Apr. 19, 2004

(65) Prior Publication Data

US 2005/0230768 A1    Oct. 20, 2005

(51) Int. Cl.
*H01L 29/84* (2006.01)
(52) U.S. Cl. ............................. 73/715; 257/415
(58) Field of Classification Search ............ 73/715; 438/53; 257/415, 419
See application file for complete search history.

(56) References Cited

U.S. PATENT DOCUMENTS 5,438,876 A * 8/1995 Lewis ..................... 73/726
5,444,901 A * 8/1995 Wiegand et al. ......... 29/25.42
5,522,267 A * 6/1996 Lewis ..................... 73/726

* cited by examiner

*Primary Examiner*—Edward Lefkowitz
*Assistant Examiner*—Andre Allen
(74) *Attorney, Agent, or Firm*—Lowrie, Lando & Anastasi, LLP (57) ABSTRACT

Embodiments of the present invention provide a diaphragm pressure gauge with an interface printed circuit board ("PCB") contained in a reference pressure chamber of the diaphragm pressure gauge for receiving signals from one or more sensing elements in the reference pressure chamber. The sensing elements can comprise, for example, piezoelectric strain gauges, piezoresistive strain gauges, capacitor elements or other elements used in determining the deflection in the diaphragm. The interface PCB can be configured to connect the sensing elements to pass-through electrical connections in the housing of the reference pressure chamber. Thus, signals can be communicated from the sensing elements, through the interface board and out of the reference pressure chamber via the pass-through electrical connections.

18 Claims, 6 Drawing Sheets

PRESSURE SENSOR DEVICE AND METHOD

TECHNICAL FIELD OF THE INVENTION

The present invention relates generally to the field of determining pressure. More particularly, the present invention relates a pressure sensor device and method to interface electrical components of a pressure gauge.

BACKGROUND

Many manufacturing processes require accurate and repeatable pressure measurements during critical process steps. These processes may rely on diaphragm pressure gauges to achieve an accurate determination of process chamber pressure. Diaphragm pressure gauges are widely used in the semiconductor industry. In part, this is because they are typically well suited to the corrosive services of this industry. They are also favored because of their high accuracy and immunity to contamination.

A typical diaphragm pressure gauge has a pressure port that is open to a process chamber or conduit containing a media being measured, a diaphragm or bellows exposed to the media being measured and a header assembly attached to the pressure port. The header assembly creates a chamber, referred to the vacuum reference chamber, which is typically (although not necessarily) evacuated to create a vacuum reference, on the opposite side of the diaphragm from the media being measured. The diaphragm or bellows is typically made of a flexible metal sheet and separates the vacuum reference chamber from the media being measured. According to some prior art sensor manufacturing techniques, the vacuum is formed on the reference side of the diaphragm by electron-beam welding the header assembly to the pressure port in a vacuum. Tungsten Inert Gas ("TIG"), laser or other welding techniques are typically employed to join the header assembly to the pressure port, with the chamber being evacuated at a later time. In addition, a getter material can be installed in the vacuum in order to maintain vacuum integrity over time.

Based on the pressure difference between the vacuum reference and the pressure of the media being measured, the diaphragm will flex. Piezoresistive strain gauges are attached to the diaphragm to detect the amount of flexion in the diaphragm. As the flexion in the diaphragm changes, the resistance of the strain gauges will change. The resistance changes of the strain gauges can be correlated to a particular pressure in the process chamber or conduit. In absolute pressures measuring devices, the strain gauges attached to the diaphragm are typically located in the vacuum reference chamber of the diaphragm vacuum gauge. Therefore, signals from the strain gauges must be transmitted out of the vacuum reference chamber to electronics for processing.

In some prior art systems, flexible cables of polyimide and copper/tin are used for this purpose. One end of a cable is attached to a portion of the pressure port using adhesives. A small wire connects the strain gauge to this end of the cable using wire bonding or soldering. The flexible cable is not generally attached directly to the strain gauge as doing so can put undue stress on the strain gauge. The other end of the flexible cable is soldered to pins on the header assembly. The pin passes through the header assembly (e.g., by means of a glass or ceramic feed-through) to transmit the signal from the cable to the printed circuit board ("PCB") outside of the header assembly. Socket or pin-type interfaces are then used to transmit signals from the diaphragm pressure gauge's PCB to external electronics.

One disadvantage of prior art systems is that the adhesives and elastomers associated with cabling in the vacuum have a higher vapor pressure compared to metals and ceramics because of their tendency for gas evolution at relatively low pressures. In other words, when used inside a vacuum or low pressure chamber, the elastomers or adhesives become a source of outgassing. As the temperature increases, the outgassing becomes worse. This can result in an increased pressure on the vacuum side of the diaphragm, leading to an unstable device output signal (e.g., reduction in signal) over time. Additionally, outgassing in the vacuum reference can cause thermally-induced errors. When the temperature increases the pressure of the vacuum reference will increase, causing the transducer output signal to reduce). Another disadvantage of this system is that the cables can interfere with movement of the diaphragm, decreasing the accuracy and stability of the diaphragm pressure gauge. Yet another problem with this method is that the flexible cables connecting the strain gauges to pins in the housing can become disconnected. To correct this problem, the hermitic seal of the pressure gauge must be broken, the cabling fixed and the vacuum reestablished.

SUMMARY

Embodiments of the present invention provide a system and method of device discovery that eliminates, or at least substantially reduces, the shortcomings of prior art device diaphragm pressure sensing devices and methods.

One embodiment of the present invention includes a device for sensing pressure that includes a pressure port defining a inlet channel, a diaphragm located at an end of the inlet channel and a header assembly coupled to the pressure port defining a reference pressure chamber on an obverse side of the diaphragm from the inlet channel. The header assembly can comprise pass-through electrical connections to communicate electrical signals from inside the reference pressure chamber to outside the reference pressure chamber. The device can further include an interface board located in the reference pressure chamber configured to connect the one or more sensing elements in the reference pressure chamber to the pass-through electrical connections of the header assembly.

Another embodiment of the present invention comprises a device for sensing pressure that includes a pressure port defining a inlet channel, a diaphragm located at an end of the inlet channel, and a header assembly hermetically sealed to the pressure port that defines a reference pressure chamber on an obverse side of the diaphragm from the inlet channel. The header assembly can include a shell, pins to communicate electrical signals from inside the reference pressure chamber to outside the reference pressure chamber and glass-to-metal seals insulating the pins from the shell. The device can further include a set of piezioresistive strain gauges responsive to flex in the diaphragm and an interface board located in the reference pressure chamber electrically connected to the set of piezoresistive strain gauges and the pins. The interface board can be configured to interface the strain gauges with the pins.

Yet another embodiment of the present invention can comprise a method of interfacing sensing elements comprising, electrically coupling a sensing element to an interface board at and electrical connection pad, wherein the sensing element is responsive to an amount of flex in a diaphragm, electrically coupling a pass-through electrical connector to the interface board, wherein the pass-through electrical connector is configured to communicate signals from inside the reference pressure chamber to outside the reference pressure chamber, wherein the interface board is configured to interface the sensing element with the pass-through electrical connector, and at least partially enclosing the sensing element and the interface board in a reference pressure chamber.

Embodiments of the present invention provide an advantage over prior art pressure gauges by reducing outgassing in the reference pressure chamber, thereby maintaining vacuum integrity.

Embodiments of the present invention provide another advantage over prior art pressure gauges by providing a clean interface in the reference pressure chamber that reduces interference with diaphragm movement.

Embodiments of the present invention provide yet another advantage over prior art pressure gauges by increasing the ease of manufacturing and reliability through reduced cabling in the reference pressure chamber.

Embodiments of the present invention provide yet another advantage over prior art pressure gauges by reducing the affects of temperature on signals output from the reference pressure chamber.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a diaphragm pressure gauge device and method that eliminates or reduces the disadvantages of prior art diaphragm pressure gauge devices and methods. More particularly, embodiments of the present invention provide a diaphragm pressure gauge with an interface printed circuit board ("PCB") or interface board contained in a reference pressure chamber of the diaphragm pressure gauge for receiving signals from one or more sensing elements in the reference pressure chamber. The sensing elements can comprise, for example, piezoresistive strain gauges, such as those produced by Measurement Specialties, Inc., headquartered in Fairfield, N.J., USA, piezoelectric strain gauges, capacitor elements or other elements used in determining the deflection in the diaphragm. The interface PCB can be configured to connect the sensing elements to pass-through electrical connections in the housing of the reference pressure chamber. Thus, signals can be communicated from the sensing elements, through the interface board and out of the reference pressure chamber via the pass-through electrical connections. Materials can be selected for use in the reference pressure chamber that are less likely to outgas and degrade the integrity of a vacuum. The interface PCB eliminates, or at least substantially reduces, the need for adhesives and elastomers in the reference pressure chamber.

Figure 1:
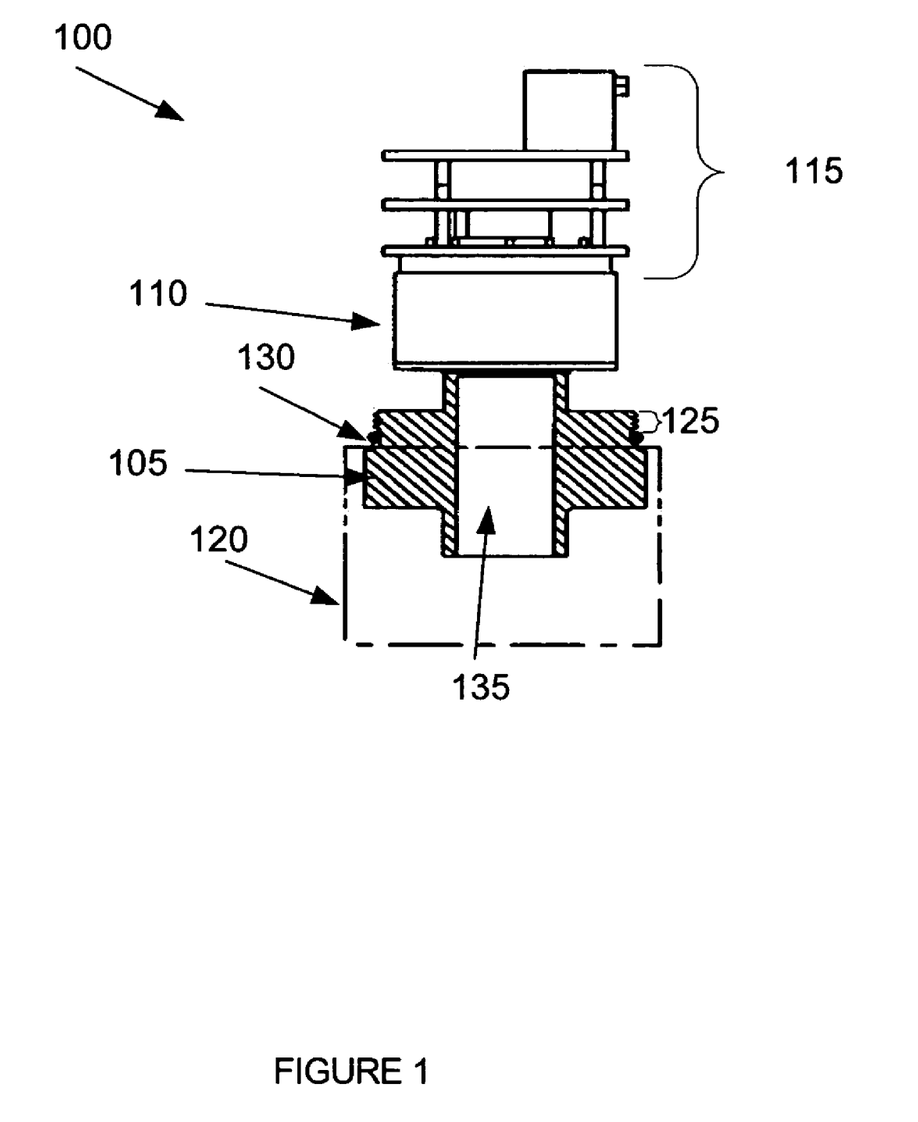
FIG. 1 is a diagrammatic representation of a diaphragm pressure gauge according to one embodiment of the present invention.
Figure 2:
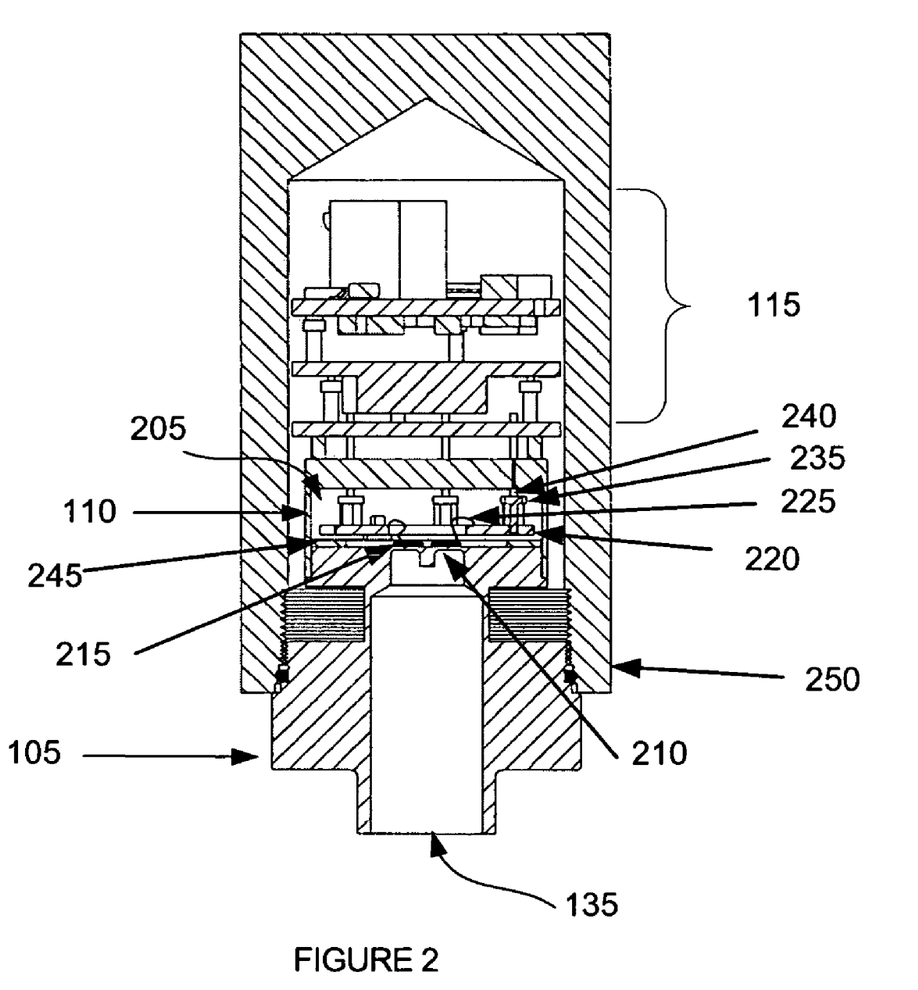
FIG. 2 is a diagrammatic representation of a cutaway view of pressure gauge according to one embodiment of the present invention.
Figures 7A, 7B:
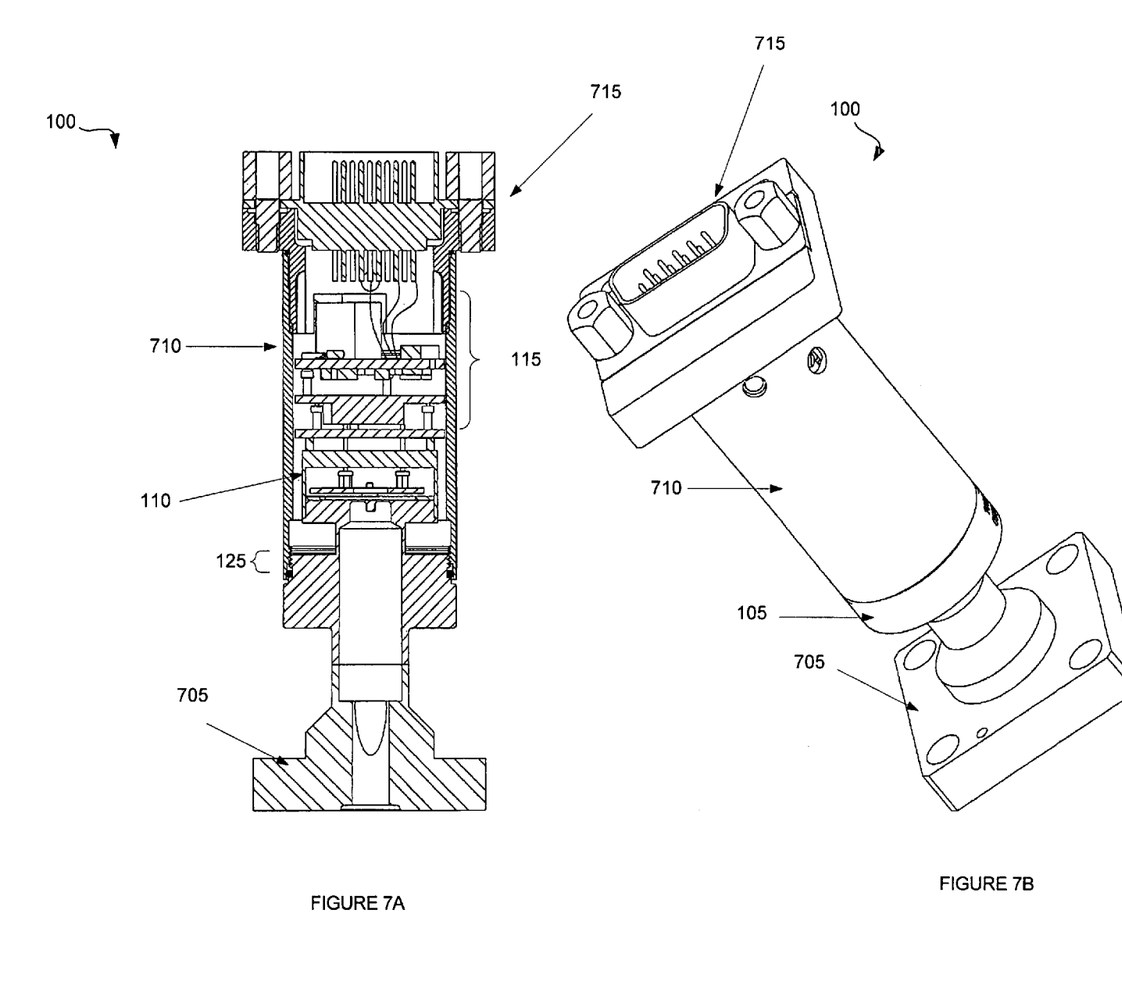
FIGS. 7A and 7B are diagrammatic representations of other embodiments of the present invention.

FIG. 1 is a diagrammatic representation of a diaphragm pressure gauge 100 according to one embodiment of the present invention. Diaphragm pressure gauge 100 can include a pressure port 105, a header assembly 110, and an electronics portion 115. Resistance welding, plasma welding, electron-beam welding or other process for joining parts can be used to seal, preferably hermetically, header assembly 110 to pressure port 105. Pressure port 105 can include a male-threaded section 125 to couple with a cap or cover (as shown in FIG. 2, FIG. 7A and FIG. 7B). O-ring 130 can seal the interface between the cap and pressure port 105.

According to one embodiment of the present invention, pressure port 105 can be exposed to a process chamber (partially represented by 120) containing a fluid (e.g., liquid, gas, gas-vapor mix) having a pressure to be measured. An inlet passage 135 can provide for fluid communication between a diaphragm (shown in FIG. 2) at the end of the inlet passage 135 and the media being measured. On the obverse side of the diaphragm, a reference pressure can be maintained in a reference pressure chamber formed by header assembly 110. Alternatively, the header assembly can allow communication with the outside environment so that the reference pressure is the ambient atmospheric pressure. Based on the difference between the pressure of the fluid in the process chamber and the reference pressure, the diaphragm will flex. Sensing elements responsive to the flexion of the diaphragm can produce a signal of a particular value indicating the amount of flexion in the diaphragm. Based on signals from the sensing elements, the pressure in the process chamber can be determined. In other words, the amount of flex in the diaphragm can be used to determine the pressure in the process chamber.

FIG. 2 is a diagrammatic representation of a cutaway view of pressure gauge 100 showing reference pressure chamber 205 formed by header assembly 110 joined to pressure port 105. Reference pressure chamber 205 can be maintained at any reference pressure including at or near vacuum conditions or very low pressure—below 5 mTorr, for example. A diaphragm 210 can be located between an inlet passage 135 of pressure port 105 and reference pressure chamber 205. Diaphragm 210 can be machined as part of pressure port 105 or can be a separate diaphragm coupled to pressure port 105 by welding or other attachment scheme. Sensing elements 215 can be coupled diaphragm 210 and can be responsive to changes in the amount of flex in diaphragm 210. According to one embodiment of the present invention, sensing elements 215 can comprise strain gauges 215 (e.g., piezoresistive strain sensors or other strain sensor known in the art) that can be responsive to changes in the flexion of diaphragm 210. Pressure gauge 100 can further include an interface PCB 220 or interface board to interface the sensing elements (e.g., strain gauges 215) with electrical connections that lead outside of the reference pressure chamber.

Diaphragm 210 is preferably formed of a flexible metal substance (e.g., stainless steel, Hastelloy, Inconel, chromium, titanium or other metal), but may also be formed from any other chosen material, such as a ceramic, provided the material flexes in response to changes in pressure and is compatible with the media the diaphragm pressure gauge is intended to measure. Pezioresistive strain sensors (or other sensing element 215) can be coupled to diaphragm 210 to measure the amount of flex in diaphragm 210. U.S. Pat. No. 6,319,743, entitled "Method of Making Thin Film Piezoresitive Sensor" filed Apr. 14, 1999, by Marchant et al. (the "'743 Patent"), which is hereby fully incorporated by reference herein, describes methods for forming thin film piezoresitive sensors in a doped semiconductor material deposited on a flexible substrate (e.g., a diaphragm). Embodiments of the present invention can include pezioresistive strain gauges 215 coupled to a diaphragm 210 through intermediate layers in the manner described in the '743 Patent. Strain gauges 215 can be can be coupled to diaphragm 210 in any other suitable manner as would be understood by those of skill in the art such that the strain gauges are responsive to the flexion of the diaphragm.

The piezorestive sensors can act, for example, as the four branches of a Wheatstone bridge, as would be understood by those of ordinary skill in the art. As diaphragm 210 deflects, the balance of the Wheatstone bridge changes indicating the amount of deflection and, correspondingly, the pressure difference between the process chamber and the reference pressure chamber 205. It should be noted that strain gauges 215 can form other circuits or can be configured to indicate pressure according to any pressure sensing scheme known in the art. Other example strain gauges include bonded foil strain gauges, silicon piezoresistive strain gauges, ceramic piezoresistive strain gauges and other strain gauges known in the art.

According to one embodiment of the present invention, sensor leads (e.g., wires 225) can be attached to pads on interface PCB 220 using wire bonding or soldering techniques known in the art. Traces on interface PCB board 220 lead to sockets 235 coupled to interface PCB 220 by soldering or other method known in the art. Sockets 235 interface with pass-through electrical connections (e.g., pins 240) of header assembly 110. Pins 240 provide pass-through electrical connections to communicate electrical signals from inside the reference pressure chamber to outside the reference pressure chamber. Electronic components external to reference pressure chamber 205 can further process signals from pins 240 to determine the pressure of the media being measured.

In one embodiment of the present invention, interface PCB 220 can be coupled directly to pressure port 105 through welding, soldering, screws, rivets or other attachment scheme known in the art. In another embodiment of the present invention, interface PCB 220 can coupled to pressure port 105 using an intermediate bracket 245. Bracket 245 can be coupled to pressure port 105 (a non-diaphragm portion) by resistance welding, Tungsten Inert Gas ("TIG") welding, plasma welding or attachment scheme, soldering, screws, rivets or other attachment scheme known in the art. Bracket 245 can reduce stresses on interface PCB 220 caused by thermal expansion coefficient differences between pressure port 105 and interface PCB 220. FIG. 2 also illustrates cap 250 in place over header assembly 110 and electronics portion 115. Cap 250 can be placed over header assembly 110 and electronics portion 115 to protect header assembly 110 and electronics portion 115 during cleaning. Additionally, as shown in FIG. 7, threaded male portion 125 can be used to interface with additional caps or covers for shipping and installation.

Figure 3A:
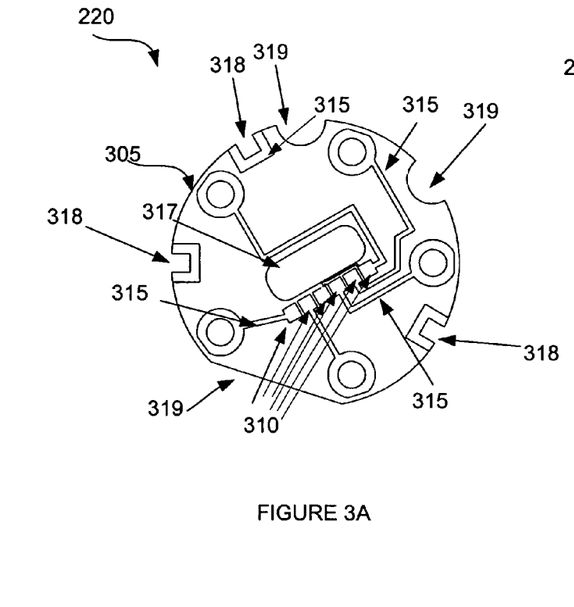
FIG. 3A illustrates one embodiment of an interface printed circuit board ("PCB")

The interface PCB can be located in the reference pressure chamber and can be configured to connect the one or more sensing elements in the reference pressure chamber to the pass-through electrical connections of the header assembly. FIG. 3A illustrates one embodiment of interface PCB 220. Interface PCB 220 can include a substrate 305, electrical connection pads 310 and traces 315. Traces 315 can connect pads 310 to sockets or other interface that can be soldered or otherwise coupled to PCB 220. Traces 315 can include any electrical traces known in the art. For example, traces 315 can be palladium/silver traces screened and fired on a ceramic substrate such as Alumina. The Alumina substrate 305 can be, by way of example, approximately 0.025 inches thick. To protect the traces, the traces can include a glass overlay.

According to one embodiment of the present invention, pads 310 can be gold pads disposed over a portion of the palladium/silver traces. Gold pads facilitate wire bonding between the strain gauges and PCB 220. It should be understood however, pads 310 can comprise any electrically conductive material to which leads from the strain sensors can be connected through, for example, wire bonding or soldering. Cutout 317 can allow wires to be lead from the strain sensors to the pads. Interface PCB 220 can further include notches 318 that can include a metal coating to facilitate soldering to a bracket. Cutouts 319 can facilitate resistance spot welding for attaching a bracket (described in FIG. 3B) and interface PCB 220 to the pressure port.

Figure 3B:
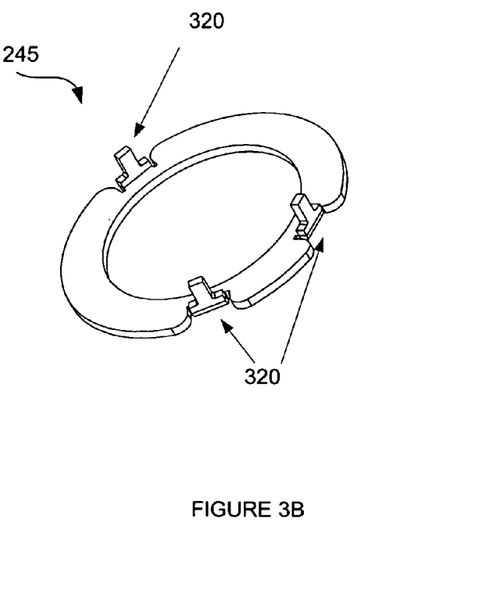
FIG. 3B is a diagrammatic representation of one embodiment of a bracket for mounting an interface PCB to a pressure port.

FIG. 3B is a diagrammatic representation of one embodiment of a bracket 245 for mounting an interface PCB to a pressure port. According to one embodiment of the present invention, can primarily comprise 316 half hard stainless steel with nickel plating. By way of example, but not limitation, bracket 245 can be approximately 0.019 inches thick with a 0.0002 inch thick nickel plating. The nickel plating facilitates soldering of bracket 245 to interface PCB 220. It should be understood, however, that bracket 245 can comprise a variety of other materials, preferably materials that can be tack welded. Bracket 245 can be spot welded to the pressure port, as shown in FIG. 1. In other embodiments of the present invention, bracket 245 can be coupled to the pressure port using other attachment schemes including, but not limited to, soldering, rivets, or screws. Bracket 245 can further include posts 320 that can be used to join bracket 245 with an interface PCB board.

Figure 3C:
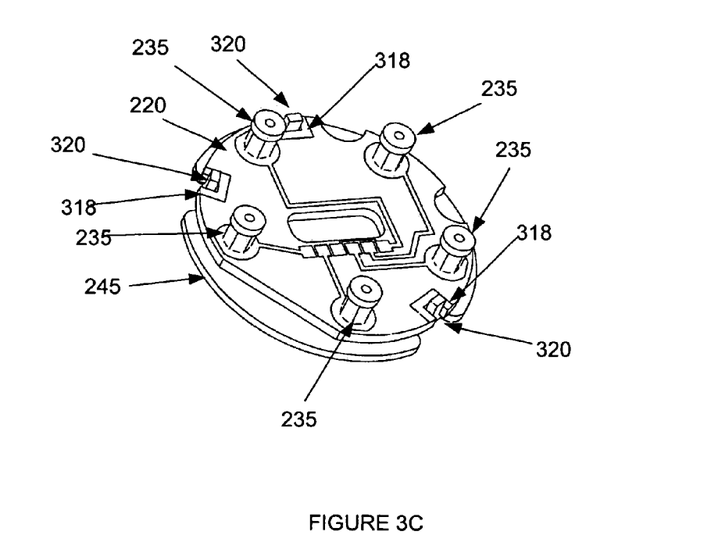
FIG. 3C is a diagrammatic representation of an interface PCB board connected to a bracket according to one embodiment of the present invention.

FIG. 3C is a diagrammatic representation of PCB board 220 connected to bracket 245. In the embodiment of FIG. 3C, posts 320 of bracket 245 can be attached to PCB 220 at notches 318 by a solder joint. Posts 320, thus, provide a point of attachment between bracket 245 and interface PCB 220 and an offset between interface PCB 220 and the diaphragm. In other embodiments of the present invention, interface PCB 220 can be coupled to bracket 245 according to any suitable attachment scheme as would understood by those of ordinary skill in the art including through the use of rivets, screws, welding, soldering, crimping (e.g., crimping of posts 330 for example) or other attachment scheme. Exemplary PCB boards and brackets can be manufactured by Tyco Electronics, a business united of Tyco International, Ltd, Headquartered in Harrisburg, Pa., USA. FIG. 3C also illustrates sockets 235 coupled to interface PCB 220. Sockets 235 can be soldered to interface PCB 220. Sockets 235, by way of example, can be Mil-Max Socket Number 8252-0-15-30-27-10-0 produced by Mil-Max Mfg. Inc. of Oyster Bay, N.Y. Sockets 235 can be configured to interface with pins on the header assembly.

Figure 4A:
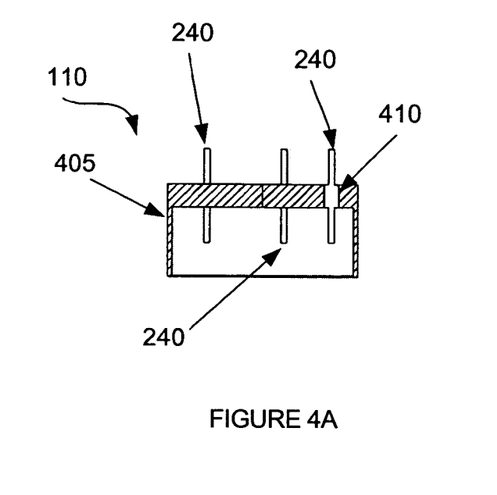
FIGS. 4A and 4B are diagrammatic representations of a header assembly according to one embodiment of the present invention.
Figure 4B:
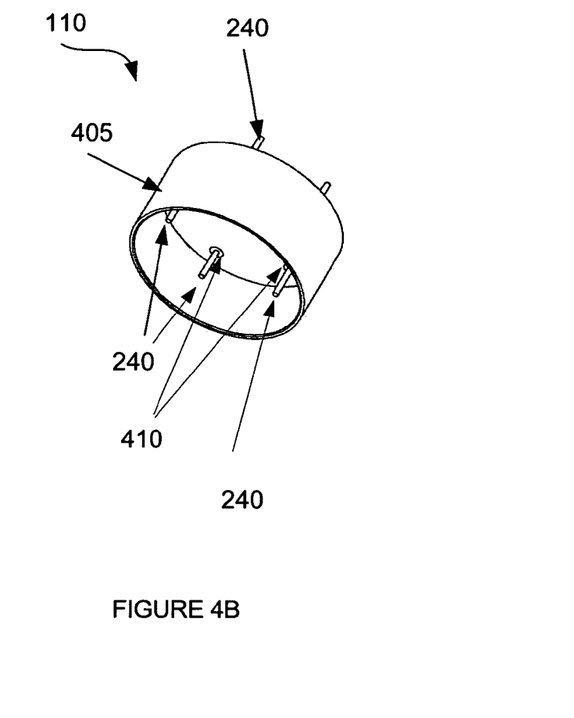

FIGS. 4A and 4B are diagrammatic representations of one embodiment of header assembly 110. Header assembly 110 can include a shell 405, electrical connections that pass through shell (e.g., pins 240) and glass-to-metal seals 410. Glass-to-metal seals 410 can be matched glass-to metal seals, compression glass-to-metal seals or other glass-to-metal seal known in the art. In absolute diaphragm pressure gauges, that is, diaphragm vacuum gauges that employ a vacuum or very low pressure as the reference pressure, shell 405 can comprise any material that can be hermetically sealed to the pressure port. By way of example, but not limitation, shell 405 can comprise 316L stainless steel and pins 240 can comprise Alloy 52. Pins 235 can be nickel plated to ensure solderability. In other embodiments of the present invention, shell 405 can allow the reference pressure chamber to be at least partially open to the ambient environment.

According to one embodiment of the present invention, the glass-to-metal seals 410 can provide an insulation resistance of at least 50 Mohms at 250 VDC between pins 235 and shell 405. Pins 235 can be positioned such that when shell 405 is placed over the interface PCB, pins 235 can align with the sockets on the interface PCB. Exemplarily header assembly assemblies with glass-to-metal seals can be manufactured by Fusite of Cincinnati, Ohio, which is a division of Emerson Electric Co. of St. Louis Mo.

Figure 5:
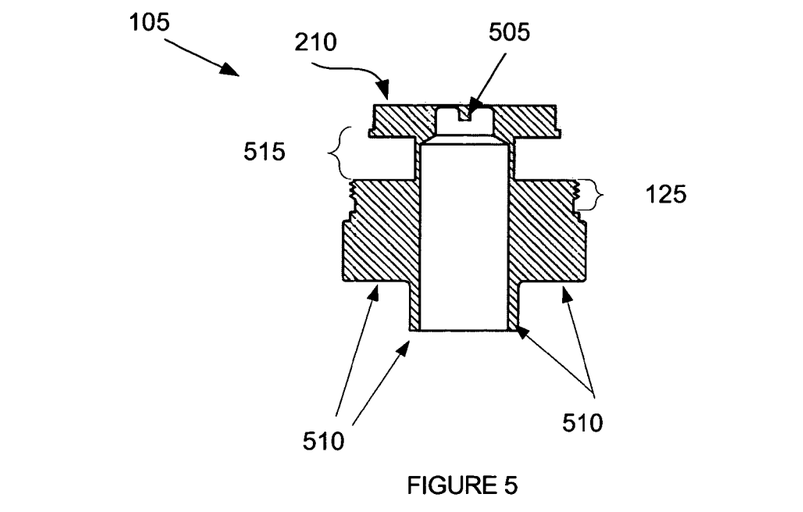
FIG. 5 is a diagrammatic representation of one embodiment of a pressure port.

FIG. 5 is a diagrammatic representation of one embodiment of a pressure port 105. Pressure port 105 can include an inlet passage 135 and a diaphragm 210. According to one embodiment of the present invention, diaphragm 210 can be an integral portion of pressure port 105. For example, pressure port 105, including diaphragm 210 can be machined from a single piece of metal. In another embodiment of the present invention, diaphragm 210 can be a separate component attached to pressure port 105 through welding or other attachment scheme. By way of example, but not limitation, diaphragm 210 can be approximately 0.140 inches to 0.200 inches in diameter and 0.007 inches to 0.023 inches thick, though diaphragm 210 may have a larger or smaller diameter or be thicker or thinner depending on the particular implementation.

Diaphragm 210 can optionally include a diaphragm boss 505. Diaphragm boss 505 can create a bending moment in diaphragm 210 to increase the linearity of the diaphragm's response to pressure changes. Generally, the benefits of diaphragm boss 505 decrease as diaphragm 210 becomes thicker. When diaphragm 210 is approximately 0.023 inches thick, or thicker, diaphragm boss 505 does not attribute appreciably to increasing the linearity of the response. In other embodiments of the present invention, linearity issues can be taken into consideration during software or hardware processing of strain gauge signals.

Male-threaded section 125 of pressure port 105 can be utilized to mate pressure port 105 with another component, such as a cap, as illustrated in FIG. 2 or packaging cover as illustrated in FIG. 7. An o-ring (not shown) can seal the interface between the cap (or other component) and pressure port 105. Additional pressure fittings can be coupled to pressure port 105 at surfaces 510. If high-temperature welding is used to attach the pressure fittings, gap 515 can isolate diaphragm 210 and attached components from the heat and stresses of the welding process. Exemplary pressure ports can be manufactured by Measurement Specialties, Inc., headquartered in Fairfield, N.J., USA.

Figure 6:
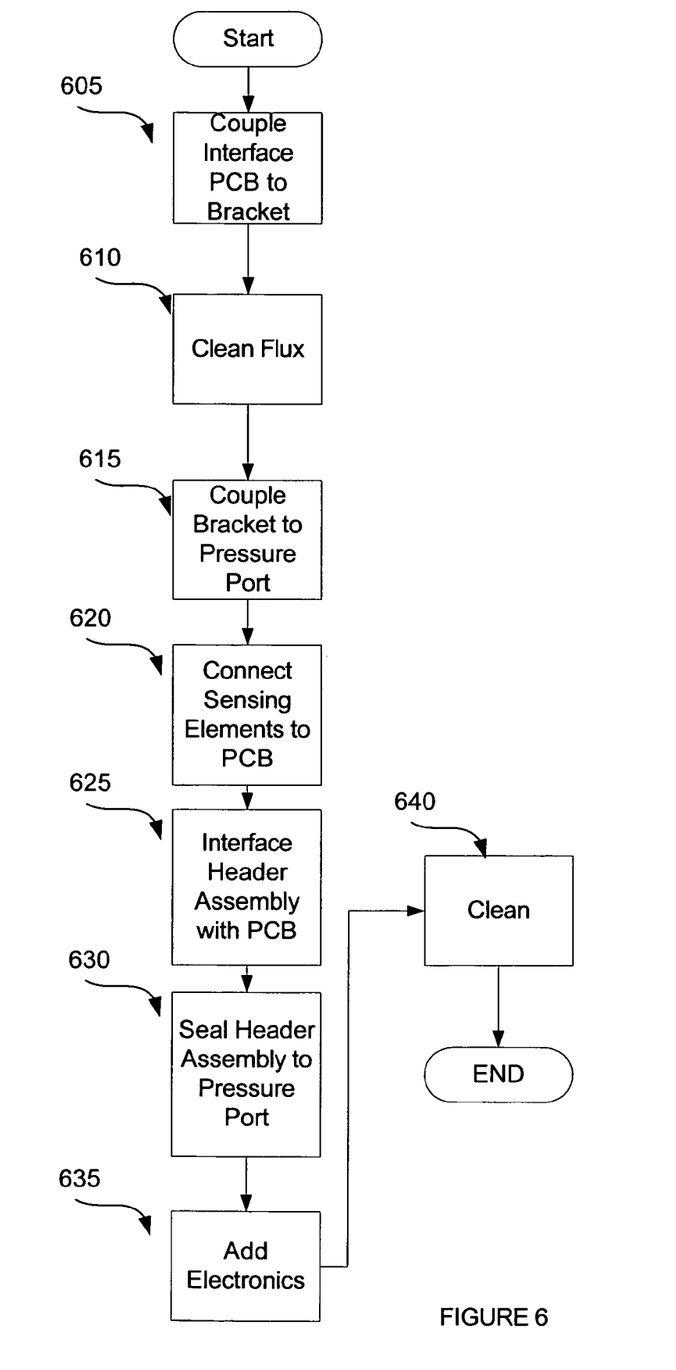
FIG. 6 is a flow chart illustrating a process for assembling a pressure sensor according to the present invention.

FIG. 6 is a flow chart illustrating one embodiment of manufacturing a diaphragm pressure gauge according to one embodiment of the present invention. It is assumed, for purposes of FIG. 6, that the diaphragm is part of the pressure port or already coupled to the pressure port, that the strain gauges are already coupled to the diaphragm (e.g., as described in the '743 Patent or other method known in the art) and that the PCB board includes sockets. According to one embodiment of the present invention, at step 605, the interface PCB and bracket are coupled together. This can be done, for example, by soldering the bracket to the interface PCB. The interface PCB and bracket assembly can be cleaned of flux and other materials that may lead to outgassing (step 610).

At step 615 the bracket can be coupled to a pressure port in a manner that will not interfere with the movement of the diaphragm. For example, the bracket can be spot welded at points outside the diameter of the diaphragm. Preferably, minimum heat is used in the welding process to prevent damage to the strain gauges. The bracket can be coupled to the pressure port using, by way of example but not limitation, TIG welding, plasma welding, resistance welding, screws, rivets or other attachment scheme. The strain gauges or other sensing element(s), at step 620, can be attached to the pads of the interface PCB using wire bonding or soldering.

At step 625, the header assembly can be put in place over the interface PCB such that the pins of the header assembly align with and are received by the sockets on the interface PCB. The header assembly, at step 630, can be sealed to the pressure port. According to one embodiment of the present invention, header assembly can be electron-beam welded to the pressure port. The electron beam welding can occur in a vacuum or low pressure to create a vacuum reference in the reference pressure chamber. The electron-beam welding can form a hermetic seal between the header assembly and the pressure port. In other embodiments of the present invention, other attachment schemes can be used including, but not limited to, resistive welding, TIG welding, plasma welding.

According to another embodiment of the present invention, rather than creating vacuum or near vacuum conditions in the reference pressure chamber, the weld can be left incomplete to allow the reference pressure chamber to be at atmospheric pressure. In other words, the diaphragm pressure gauge can be configured to read absolute pressure or gauge pressure. In other embodiments of the present invention, the header assembly can include holes or passages to allow the reference pressure chamber access to the atmosphere. In yet another embodiment of the present invention, the hermetic seal can be formed at a particular pressure (e.g., atmosphere) to produce a seal gauge pressure gauge. Because the same header assembly can be hermetically sealed to the pressure port in a vacuum, hermetically sealed to the pressure port at a particular pressure or non-hermetically sealed to the pressure port (through an incomplete weld, for example) the same components can be used to create an absolute pressure gauge, a gauge pressure gauge or a seal gauge pressure gauge.

At step 635 additional electronics can be added exterior to the reference pressure chamber. These electronics can include for example, amplifier and compensation boards to condition signals received from the pins of the header assembly. The electronics can perform arbitrary functions and signal conditioning based on the particular implementation and can communicate with other components, such controllers.

For semiconductor manufacturing processes, oxidation in the pressure port may introduce contaminants into the process fluid. It should be noted that various processes may cause oxidation of the pressure port. For example, the process of bonding strain gauges to the diaphragm may require high temperatures (e.g., in excess of 600 C.) that will oxidize the pressure port. Therefore, at step 640, the pressure port can undergo ultra-high purity cleaning. To prevent electro-polishing liquid from coming in contact with the header assembly and electronics external to the header assembly, a cap (e.g., cap 250 of FIG. 2) can be placed over the header assembly and external electronics.

FIGS. 7A and 7B are diagrammatic representations of another embodiment of diaphragm pressure gauge 100. In FIG. 7A, a pressure fitting 705 is coupled to pressure port 105 by, for example, welding, or other attachment scheme known in the art. Pressure fitting 705 can be any pressure fitting known in the art including, but not limited to, a surface mount fitting configured to connect to a modular base. A covering 710 is coupled to pressure port 105 by male threaded section 125 of pressure port 105. Covering 710 can protect header assembly 110 and electronics portion 115 during shipping and installation. Additionally, covering 710 can provide support for a communications interface 715, such as a male DB-15 connector or other communication port known in the art. Communications interface 715 can be connected to electronics in diaphragm pressure gauge 100 for communicating data to/from other systems.

It should be noted that while the present invention has been discussed in conjunction with a diaphragm pressure gauge that determines pressure based on strain gauges, embodiments of the present invention can also be utilized in diaphragm capacitance pressure gauges. Typically, in a diaphragm capacitance gauge, there is a thin metal or metal coated ceramic diaphragm that is exposed on one side to the process gas. On the other side of the diaphragm, there is typically a reference pressure chamber at or near a vacuum state. The diaphragm is usually on the order of 3/1000-inch thick or less, depending on the characteristics of the particular capacitance diaphragm gauge. As the pressure in process chamber increases, the amount of deflection in the diaphragm changes. This can cause the capacitance between the diaphragm and another metal or metal coated plate or electrode to change.

According to embodiments of the present invention, the electrode or metal plate and diaphragm, rather than the strain gauges, can be connected to the interface PCB board as the sensing elements. The interface PCB board can connect to pass-through electrical connectors (e.g., pins) in the header assembly to communicate signals to external electronics that can process the signals. The electronics external to the header assembly can output an analog sensor voltage or current that is influenced by the capacitance between the diaphragm and metal plate. Other sensing elements in the reference pressure chamber can also be interfaced with pass-through electrical connectors by the interface PCB.

Additionally, embodiments of the present invention can be used in a variety of flow sensing and flow control devices, such as mass flow control ("MFC") devices, including, but not limited to those disclosed in U.S. Pat. No. 6,348,098, issued Feb. 19, 2002, entitled "Flow Controller" by McLoughlin et al., U.S. Pat. No. 6,527,862, issued Mar. 4, 2003, entitled "Flow Controller" by McLoughlin et al., U.S. Pat. No. 6,640,822, issued Nov. 4, 2003, entitled "System and Method of Operation of a Digital Mass Flow Controller" by Tinsley, et al., U.S. Pat. No. 6,681,787, issued Jan. 27, 2004, entitled "System and Method of Operation of a Digital Mass Flow Controller" by Tinsley, et al., PCT application PCT/US03/22579, entitled "Liquid Flow Controller and Precision Dispense Apparatus and System," filed Jul. 18, 2003, which claims priority of Provisional Application Ser. No. 60/397,053 filed Jul. 19, 2002, entitled "Liquid Flow Controller and Precision Dispense Apparatus and System", and U.S. patent application Ser. No. 10/777,300, filed Feb. 12, 2004, entitled "System and Method for Flow Monitoring and Control" by Brodeur, et al, each of which is hereby fully incorporated by reference herein. Other exemplary mass flow controllers with which embodiments of the present invention can be used are manufactured by Mykrolis Corporation of Billerica, Mass. Additionally, embodiments of the present invention can be utilized in a variety of other force measurement applications including torque sensors, load cells and accelerometers.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A device for sensing pressure comprising:
    a pressure port defining a inlet channel;
    a diaphragm located at an end of the inlet channel;
    a header assembly coupled to the pressure port defining a reference pressure chamber on an obverse side of the diaphragm from the inlet channel, wherein the header assembly comprises pass-through electrical connections to communicate electrical signals from inside the reference pressure chamber to outside the reference pressure chamber; and
    an interface board located in the reference pressure chamber configured to connect one or more sensing elements in the reference pressure chamber to the pass-through electrical connections of the header assembly.

2. The device of claim 1, wherein the interface board further comprises:
    a set of electrical connection pads, wherein each sensing element is electrically coupled to the interface board at an electrical connection pad;
    a set of sockets; and
    traces connecting the set of electrical connection pads to the set of sockets.

3. The device of claim 2, wherein the pass-through electrical connections are pins and wherein the set of sockets are configured to interface with the pins.

4. The device of claim 3, wherein header assembly further comprises a shell and glass-to-metal seals between the pins and the shell.

5. The device of claim 4, wherein the header assembly is hermitically sealed to the pressure port.

6. The device of claim 5, wherein the reference pressure chamber has a pressure of below 5 mTorr.

7. The device of claim 3, wherein the one or more sensing elements are wirebonded to the electrical connection pads.

8. The device of claim 2, wherein the reference pressure chamber is open to the atmosphere.

9. The device of claim 1, wherein the diaphragm and pressure port are an integral machined component.

10. The device of claim 1, wherein the diaphragm is coupled to the pressure port.

11. The device of claim 1, further comprising a bracket, wherein the interface board is coupled to the bracket and the bracket is coupled to the pressure port.

12. A method of interfacing sensing elements comprising:
electrically coupling a sensing element to an interface board at and electrical connection pad, wherein the sensing element is responsive to an amount of flex in a diaphragm;
electrically coupling a pass-through electrical connector to the interface board, wherein the pass-through electrical connector is configured to communicate signals from inside the reference pressure chamber to outside the reference pressure chamber, and wherein the interface board is configured to interface the sensing element with the pass-through electrical connector; and
at least partially enclosing the sensing element and the interface board in a reference pressure chamber.

13. The method of claim 12, further comprising coupling the interface board to a bracket and coupling the bracket to a pressure port.

14. The method of claim 12, further comprising at least partially enclosing the sensing element and the interface board in the reference pressure chamber by coupling a shell to a pressure port.

15. The method of claim 14, wherein the shell is hermetically sealed to the pressure port.

16. The method of claim 15, wherein the shell in hermetically sealed to the pressure port through electron beam welding in a vacuum to create vacuum conditions in the reference pressure chamber.

17. The method of claim 15, further comprising coupling at least one additional electronic component to the pass-through electrical connector outside of the reference pressure chamber.

18. The method of claim 12, wherein electrically coupling a pass-through electrical connector to the interface board further comprises aligning a set of pins with a set of sockets and inserting the set of pins into the set of sockets.

* * * * *